March 16, 1954 C. R. ANDERSON Re. 23,799

METHOD OF PUMPING LIQUID OXYGEN

Original Filed July 16, 1945 2 Sheets-Sheet 1

INVENTOR.
Carl R. Anderson

BY
Barnes, Kisselle, Raugh & Raisch
Attorneys

March 16, 1954 C. R. ANDERSON Re. 23,799

METHOD OF PUMPING LIQUID OXYGEN

Original Filed July 16, 1945 2 Sheets-Sheet 2

INVENTOR.
Carl R. Anderson

BY
Barnes, Kisselle, Raughlin & Price
Attorneys.

Reissued Mar. 16, 1954

Re. 23,799

UNITED STATES PATENT OFFICE 23,799

METHOD OF PUMPING LIQUID OXYGEN

Carl R. Anderson, Allentown, Pa., assignor to Air Products, Incorporated, Chattanooga, Tenn., a corporation of Michigan Original No. 2,480,094, dated August 23, 1949, Serial No. 605,407, July 16, 1945. Application for reissue November 24, 1952, Serial No. 322,369

12 Claims. (Cl. 62—175.5)

Matter enclosed in heavy brackets [ ] appears in the original patent but forms no part of this reissue specification; matter printed in italics indicates the additions made by reissue.

This invention relates to a method of pumping liquefied gases.

An object of the invention is to provide a method of withdrawing a liquefied gas from a vessel in which it is stored or is being collected, in such manner as to avoid the possibility of gas locking the pump.

An object of the invention is to provide a method of withdrawing a stream of liquefied gas of any desired constant quantity from a collecting pool in a gas fractionating column.

An object of the invention is to provide a method of withdrawing a stream of gas from a fractionating tower and of reducing the gas to liquid form for delivery under pressure by means adapted to the pumping of liquids.

An object of the invention is to provide a method of pumping liquefied oxygen directly from a pool of commercially pure oxygen in a fractionating tower to cylinders or pipe lines in which gaseous oxygen is transported under high pressure, thereby avoiding the requirement for an oxygen storage tank and a gaseous oxygen compressing system.

An object of the invention is to provide a method of withdrawing oxygen in gaseous form from the pure oxygen vapor space in a fractionating tower, liquefying the gaseous stream and delivering the oxygen into pressure cylinders or pipe lines, thereby retaining in the tower any lubricating oil or other combustible [substance] *substances* which may enter the tower with the air stream.

While the invention is applicable to the handling of all liquefied gases (liquids having a boiling point so much below atmospheric temperature that heat leakage into insulated apparatus is likely to produce difficulties in pumping), it is found most useful in connection with the pumping of liquid oxygen because of the very low atmospheric-pressure boiling point of this liquid and the fact that the presence, in the apparatus containing the compressed gas at atmospheric temperature, of any trace of carbonaceous substances is the source of extreme danger.

The invention will therefore be described in connection with the manipulation of oxygen, it being understood that such description is illustrative and not limiting.

Figure 1:
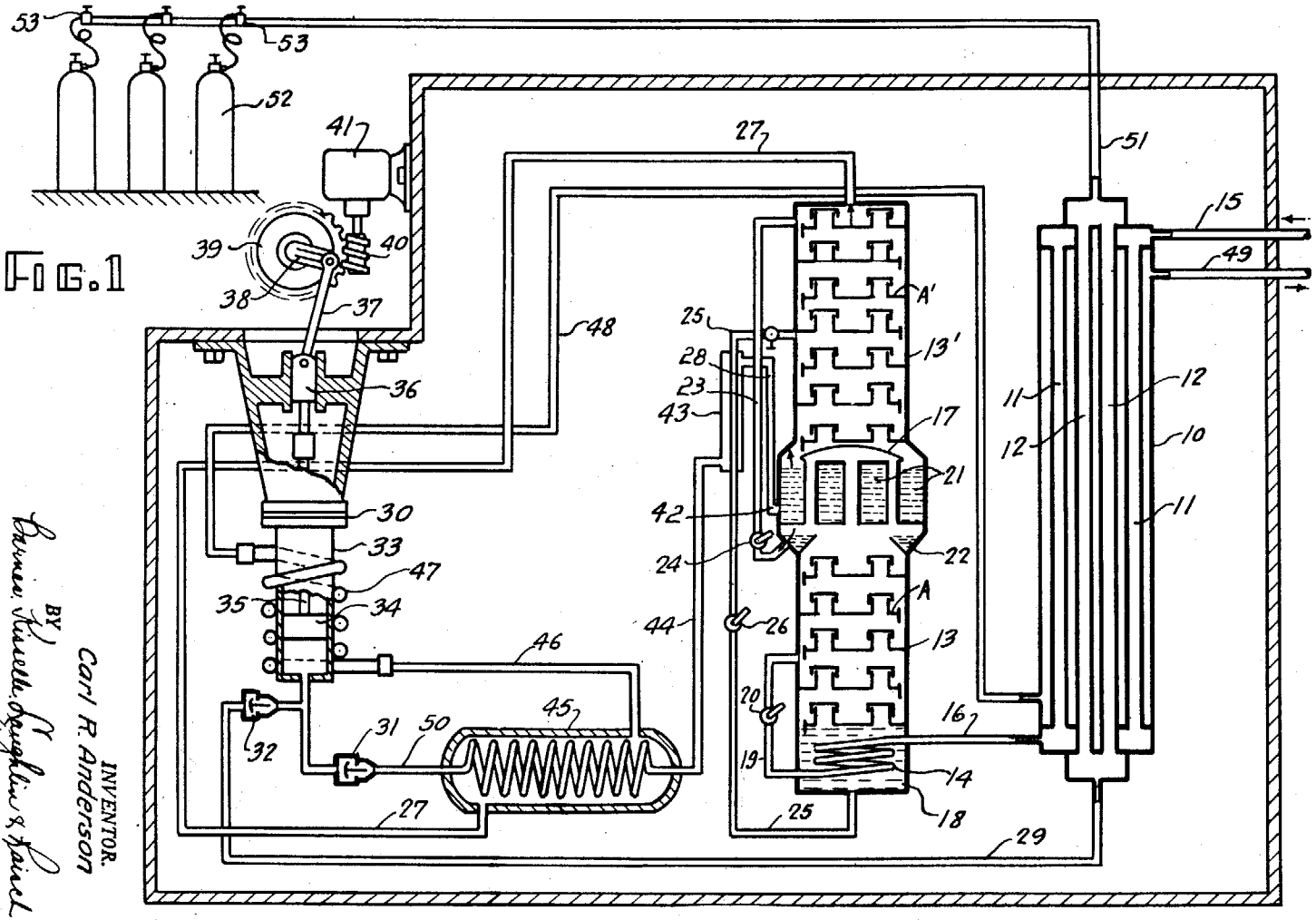

In the attached drawings apparatus for carrying out the invention is illustrated schematically in two modifications, to wit:

Fig. 1 illustrates a form in which oxygen is withdrawn in the liquid state from the pure oxygen pool in the base of the upper section of a double fractionating column and is cooled by heat interchange with crude oxygen in its passage from the high pressure to the low pressure stage of the column and in which the liquid oxygen is cooled below its boiling point at the pressure existing in the pump cylinder during the suction stroke by heat interchange with gaseous product nitrogen from the low pressure stage of the column.

Figure 2:
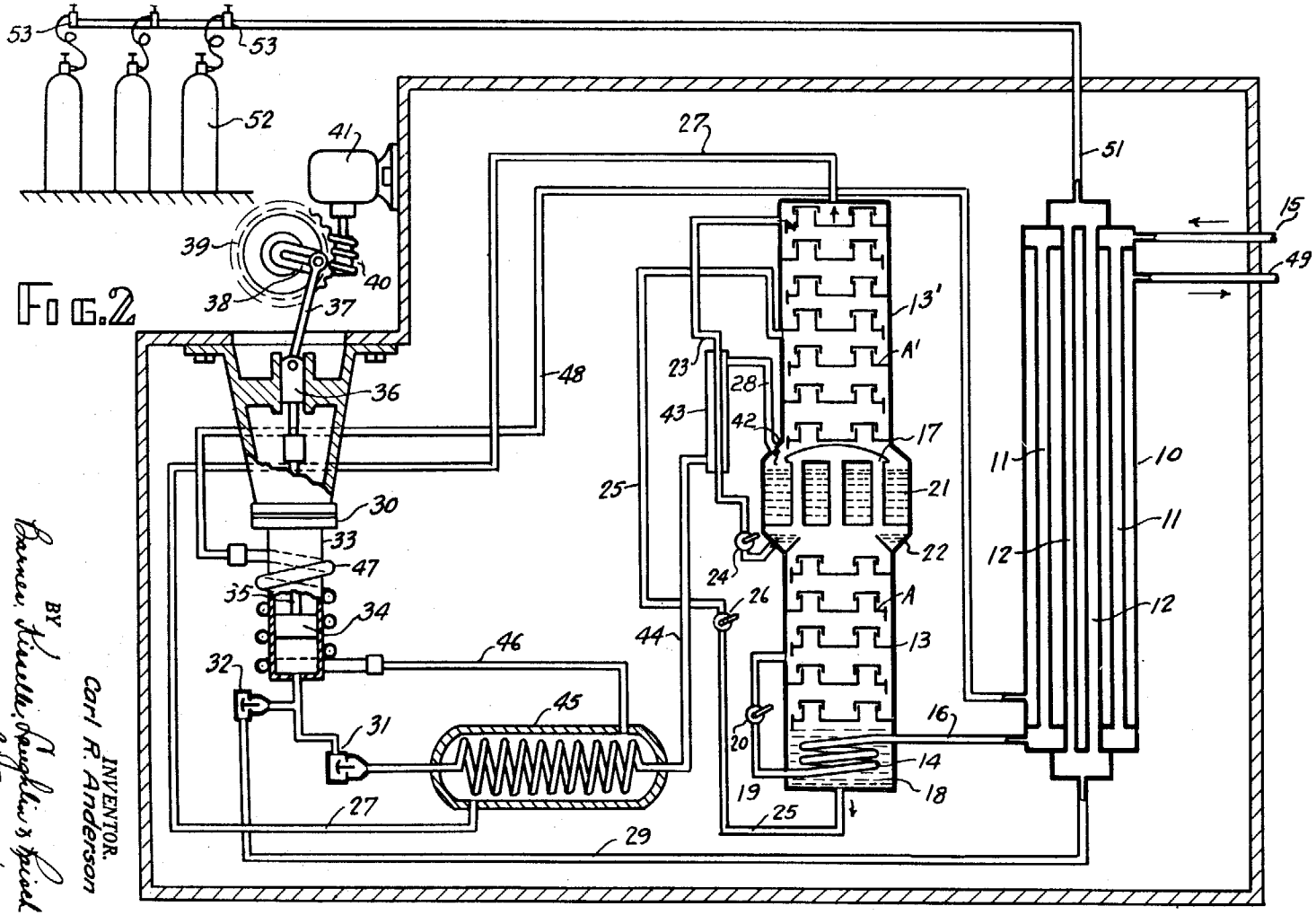

Fig. 2 illustrates a form in which oxygen is withdrawn in the gaseous state from the pure oxygen pool in the base of the upper section of a double fractionating column and is condensed by heat interchange with liquid nitrogen from the high pressure stage of the column and in which the condensed oxygen is cooled below its boiling point at the pressure existing in the pump cylinder during the suction stroke by heat interchange with gaseous product nitrogen from the low pressure stage of the column.

The fractionating equipment illustrated is conventional and any preferred form of double column may be used.

In the fractionation of air in a double column, the top products of both the high pressure and low pressure sections are usually mixtures considerably richer in nitrogen than is atmospheric air, rather than being pure nitrogen. These products are customarily referred to as nitrogen by those versed in the art, hence in the use of the word nitrogen herein and in the claims, it is intended that its meaning shall include such nitrogen rich mixtures.

For the purpose of illustration the double column apparatus of Figs. 1 and 2 consists essentially of a double pass heat interchanger 10, having two banks of tubes 11—11 and 12—12, together with a fractionating column consisting of two sections 13 and 13', each provided with a plurality of bubbling plates A and A' respectively and a boiling coil 14 in the base. Boiling coil 14, although desirable, is not essential. Coil 14 may be omitted and air passed directly from interchanger 10 through an expansion valve 20 and into the bottom compartment of high pressure column 13 immediately above pool 18.

The flows through this system, which also are conventional, are as follows: Air under pressure, from a source not shown, enters the system through feed pipe 15, passes through tubes 11, thence through pipe 16 to the boiling coil 14. The upper section is provided with a condenser 17, the condensate from which drains into the lower section of the tower.

The cooled high pressure air from interchanger 10 passes through boiling coil 14, immersed in a pool 18 of crude (for example 35%) oxygen in the base of the lower section and thence, through pipe 19 and expansion valve 20 into the lower section at medial height. This section fractionates the feed in the well-known manner, a gas richer in nitrogen than atmospheric air rising into the condenser 17, which is immersed in a pool 21 of pure oxygen collecting in the base of the upper section. As this section is maintained at a materially lower pressure than the lower section, the condenser acts as a reboiler for the pure oxygen and returns the nitrogen rich gas as a liquid, part falling into pool 22 and part falling on to the top plate of the lower section 13. From pool 22 some of the liquid overflows and, together with that part falling directly on to the top plate from the condenser, acts as reflux in the lower section, while the remainder is transferred through pipe 23 and expansion valve 24 to the top of the upper section in which it acts as reflux. The crude oxygen is transferred through pipe 25 and expansion valve 26 to a medial point in the upper section, in which it is fractionated in the well-known manner to substantially pure oxygen and slightly impure nitrogen.

At this point we have two products—nitrogen and oxygen—each at a temperature which slightly exceeds its atmospheric pressure boiling point. These temperatures are approximately 81° Kelvin (at five pounds gauge) for nitrogen and 93° Kelvin (at six pounds gauge) for oxygen.

If these products were to be recovered as gases at atmospheric temperature and pressure, they would merely be conducted to interchanger 10, the nitrogen by connecting pipe 27 to discharge directly into the interchanger and the oxygen by connecting pipe 28 to discharge directly into line 29 and thence into the interchanger, the pressures in the column being sufficient to discharge the gaseous product against frictional resistance and atmospheric pressure.

It is, however, very desirable in many cases to conduct the oxygen product directly to the cylinders or pipe lines in which it is transported as a compressed gas, at pressures ranging up to 2500 or more pounds per square inch. Although it is common practice to bring the gaseous oxygen to substantially atmospheric temperature and pressure and to thereafter compress it, it is desirable to pump it as a liquid and to vaporize it while subjected to the pump pressure, prior to entering the pipe line or storage vessel.

An advantage in pumping the oxygen in liquid phase lies in the avoidance of use of the aqueous lubricants required in compressing gaseous oxygen, these lubricants introducing water vapor which must be removed by chemical drying and adsorption to obtain dry oxygen in the transport cylinder or pipe line.

The step of pumping liquid oxygen has proven in practice to be one of great difficulty. The liquid is, in the nature of the case, at its boiling point at the existing pressure. From this it follows that any reduction in pressure, such as is occasioned by fluid friction in the pump suction, or any increase in enthalpy due to leakage of heat into the pump body or to frictional heat transmitted into the liquid, will cause the evolution of gas which locks the suction and puts the pump out of commission. A further cause of vapor lock is back leakage through the discharge valve, the high pressure leakage liquid partially flashing to the gaseous state.

I have solved this problem by two steps which are preferably used together but may be used individually. The first is to utilize a small portion of the cooling effect available in the gaseous product nitrogen for cooling the stream of liquid oxygen, on its way to the pump, to a temperature below that corresponding to its boiling point at the pressure existing in the pump cylinder during the suction stroke. The second is to utilize another small portion of the refrigerating value of the nitrogen in cooling the pump cylinder.

In the two figures of the instant application, the oxygen pump 30 may be any pump capable of handling liquid at high pressure but is here illustrated as a single acting plunger pump, having a suction valve 31, a discharge valve 32, a cylinder 33, a plunger 34, a rod 35, a crosshead 36, a connecting rod 37, a crank 38, a worm gear 39, a driving worm pinion 40 and an actuating motor 41.

In the form shown in Fig. 1, oxygen withdrawal pipe 28 is connected into the base of upper column section 13' at a point 42 below the liquid level of pool 21. The oxygen thus withdrawn is cooled in interchanger 43 by heat interchange with the stream of crude oxygen flowing through pipe 25, interchanger 43 being downstream from expansion valve 26. The liquefied oxygen then flows through pipe 44 to interchanger 45 in which it is cooled by heat interchange with gaseous nitrogen as described below, thence through pipe 50 and suction valve 31 into the pump cylinder on the upstroke of the plunger. On the downstroke the liquid passes through discharge valve 32 and pipe 29 to the tube bank 12 of interchanger 10, in which the stream is brought to atmospheric temperature and the gaseous condition and is discharged at any desired pressure through pipe 51. If desired, the stream in pipe 29 may be directed to a storage vessel or pipe line in liquid condition, but more usually it will be passed through the interchanger and delivered by pipe 51 to pressure cylinders 52 or other pressure vessels or to pipe lines in which it is transported under pressure in the gaseous state.

The stream of gaseous nitrogen in pipe 27 is passed through the opposite side of interchanger 45, preferably in counter-flow to the stream of liquid oxygen, and the liquid is thus cooled to a temperature below its boiling point at column pressure.

The stream of nitrogen which, because of its relatively great mass, has been only slightly elevated in temperature, flows through pipe 46 and a coil 47 wrapped around the pump cylinder, in which it acts to withdraw any heat which might otherwise be transmitted to the liquid in the pump and tends to maintain the low temperature imparted to the liquid in interchanger 45.

From this coil the gaseous nitrogen passes through pipe 48 to the shell of interchanger 10, from which it is delivered in gaseous form and at substantially atmospheric temperature through pipe 49.

By the use of this cooling cycle, a properly designed and insulated pump may be caused to operate at full stroke capacity for extended periods and without any risk whatever of gas locking. The refrigerative value lost by the nitrogen in cooling the liquid oxygen is largely recovered in the evaporation of the oxygen in interchanger 10. The heat absorbed by the nitrogen from the pump is due to packing friction and infiltration and causes a small loss of refrigerating effect which may be compensated by a corresponding adjustment in air feed pressure.

Cylinders 52 are coupled to the gaseous oxygen discharge pipe 51 through individual valves 53 by means of which the stream of gaseous oxygen emanating from interchanger 10 may be stored in synchronism with the output of the fractionating system. The pressure maintained in oxygen bank 12—12 of *the* interchanger will be equal to the momentary pressure in the cylinder being filled, plus a small pressure drop in the transmission line and valve.

In the form shown in Fig. 1, it will be seen that the stream of oxygen which is drawn from the upper section of the double fractionating column is cooled by crude oxygen drawn from the highest pressure stage of the column and is cooled by gaseous nitrogen drawn from the lowest pressure stage of the column.

The modification shown in Fig. 2 is designed to eliminate any danger of oil being carried with the oxygen into the filled cylinders or into any part of the apparatus in which detonative combustion might occur. This permits the use of oil lubricated primary air compressors and avoids the difficulties attendant on water or soap-water lubrication.

In the modification shown in Fig. 2, it is proposed to condense the oxygen with nitrogen drawn from the highest pressure stage of the operation and to cool the liquefied oxygen with gaseous nitrogen drawn from the lowest pressure stage of the operation. The crude oxygen is transferred through pipe 25 and expansion valve 26 to a medial point in the upper section 13' in which it is fractionated in the well-known manner to substantially pure oxygen and slightly impure [oxygen] *nitrogen*. The withdrawal of oxygen from pool 21 is accomplished by the same means as described above with respect to the form shown in Fig. 1 except for that the point 42 is above the liquid level of the oxygen in the pool.

The gas withdrawn at point 42 above pool 21 is reliquefied in condenser 43 by heat interchange with nitrogen withdrawn from pool 22 in condenser 17. Liquid nitrogen from pool 22 is withdrawn through line 23 and expansion valve 24 and passes through condenser 43 where it condenses pure oxygen vapor. This step of condensing the gaseous oxygen has the major advantage of preventing the passage of combustible impurities into any part of the system containing compressed oxygen. The nitrogen passes into the upper portion of section 13' where its liquid portion serves as reflux and where its gaseous portion joins and becomes a part of the product nitrogen which passes out through pipe line 27. The gaseous product nitrogen flows through line 27 into interchanger 45 (where it sub-cools the liquid oxygen) and thence through line 46 and coil 47 (where it sub-cools pump 30) and thence through line 48 into heat interchanger 10 and thence outwardly through line 49, as described above with respect to Fig. 1. The condensed oxygen from condenser 43 flows through line 44, heat interchanger 45 and by intake valve 31 into the cylinder of pump 30 from whence it is discharged as a liquid by discharge valve 32 and line 29 into tubes 12 of the interchanger and thence through line 51 into cylinders 52, as in the above described form of the invention.

From the above it will be seen that the oxygen product can be withdrawn from the column in either the liquid or the gaseous form. In the first alternative interchangers 43 and 45 function to cool the liquid in stages and in the second alternative interchanger 43 functions mainly for condensing the gaseous oxygen and interchanger 45 functions mainly for cooling the condensed stream.

This application is a continuation-in-part of my copending application Serial No. 488,650, filed May 27, 1943.

I claim:

1. In the conduct of a multistage fractionating operation in which operation a mixture of component gases having boiling points substantially below atmospheric temperature is compressed and cooled, the compressed and cooled mixture expanded and the effluent of the expansion step subjected to the fractionation operation to produce a higher boiling point fraction and a lower boiling point fraction, the steps comprising: withdrawing a stream of the higher boiling point fraction from the low pressure stage of said operation; bringing said stream into a first heat interchange against an expanded product drawn from the highest pressure stage of said operation; reducing the temperature of said stream to a point below the boiling point of the higher boiling point fraction at the minimum momentary pressure reached in an ensuing pumping step, in a second heat interchange between said higher boiling point fraction stream and a fluid different from and colder than said expanded product, and pumping said higher boiling point fraction stream in substantially liquid form.

2. In the conduct of a multistage fractionating operation in which operation a mixture of component gases having boiling points substantially below atmospheric temperature is compressed and cooled, the compressed and cooled mixture expanded and the effluent of the expansion step subjected to the fractionation operation to produce a higher boiling point fraction and a lower boiling point fraction, the steps comprising: withdrawing a stream of higher boiling point fraction vapor from the low pressure stage of said operation; condensing said vapor stream in a first heat interchange against an expanded product drawn from the highest pressure stage of said operation; reducing the temperature of said condensed stream to a point below the boiling point of the higher boiling point fraction at the minimum momentary pressure reached in an ensuing pumping step, in a second heat interchange between said higher boiling point fraction stream and a fluid different from and colder than said expanded product, and pumping said higher boiling point fraction stream in substantially liquid form.

3. In the conduct of a multistage fractionating operation in which operation a mixture of component gases having boiling points substantially below atmospheric temperature is compressed and cooled, the compressed and cooled mixture expanded and the effluent of the expansion step subjected to the fractionation operation to produce a higher boiling point fraction and a lower boiling point fraction, the steps comprising: withdrawing a stream of said higher boiling point fraction from the fractionating operation; pumping said withdrawn stream in liquid form in a manner producing rapid periodic fluctuations in pressure; cooling said stream below its original temperature and to a temperature at which the evolution of vapor from said higher boiling point fraction at the minimum momentary pressure reached in said pumping step is substantially avoided; [and] effecting said cooling at least in part by heat interchange between said stream and an expanded product drawn from the highest pressure stage of said operation, *and passing the expanded product from the heat interchange to a lower pressure stage of said operation.*

4. In a process involving the withdrawal of a stream of oxygen from the lower pressure stage of a multistage air fractionating operation, the steps comprising: progressively removing heat from said stream in two stages, each comprising a heat interchange between said oxygen stream and a colder fluid from said operation, in the second of which stages said colder fluid is gaseous nitrogen drawn from the low pressure stage of said operation, thereby reducing said oxygen to a temperature avoiding flashing in an ensuing pumping step, and thereafter pumping said withdrawn stream to a desired destination in liquid form.

5. In a process involving the withdrawal of a stream of oxygen from the low pressure stage of a multistage air fractionating operation, the steps comprising: bringing said stream into heat interchange relation successively with crude oxygen drawn from the highest pressure stage of said operation and with gaseous nitrogen drawn from the low pressure stage of said operation, the last said interchange reducing said oxygen to a temperature of stability in an ensuing pumping step, and pumping said withdrawn stream to a desired destination in liquid form following last said heat interchange.

6. In a process involving the withdrawal of a stream of oxygen from the low pressure stage of a multistage air fractionating operation, the steps comprising: bringing said stream into heat interchange relation successively with liquid nitrogen drawn from the highest pressure stage of said operation and with gaseous nitrogen drawn from the low pressure stage of said operation, and pumping said withdrawn stream to a desired destination in liquid form following last said heat interchange.

7. In a process involving the withdrawal of a stream of oxygen vapor from the low pressure stage of a multistage air fractionating operation, the steps comprising: condensing said vapor stream by heat interchange against a stream of liquid nitrogen drawn from the highest pressure stage of said operation; further cooling said condensed stream to a temperature of stability in an ensuing pumping operation, and pumping said cooled stream in liquid form.

8. In a process involving the withdrawal of a stream of oxygen vapor from the low pressure stage of a multistage air fractionating operation, the steps comprising: condensing said vapor stream by heat interchange against a stream of liquid nitrogen drawn from the highest pressure stage of said operation, and cooling the condensed stream below its temperature of condensation and to a temperature of stability at a reduced pressure by heat interchange against a stream of gaseous nitrogen drawn from the lowest pressure stage of said operation.

9. In a method for producing oxygen and conditioning it for delivery to a receiving means, in which air after compression and cooling is rectified in two stages maintained respectively at a relatively high and a relatively low pressure, in which a product enriched in nitrogen and a product enriched in oxygen are produced in said high pressure stage and transferred to said low pressure stage and in which a cold nitrogen product and a liquid oxygen product having a temperature corresponding to its boiling point at said low pressure are produced in said low pressure stage; the set of steps comprising subjecting fluid from said oxygen product to heat exchange successively with a colder fluid derived from said high pressure stage and with a colder fluid derived from said low pressure stage and thereby forming a sub-cooled liquid oxygen product; pumping said sub-cooled liquid oxygen product to a desired higher pressure, said sub-cooling reducing the liquid oxygen temperature at least sufficiently to prevent the same from flashing into vapor during such pumping; and converting the liquid oxygen at said higher pressure into a gas by heat exchange with the compressed air to be liquefied.

10. The process of separating air in to its constituents, oxygen and nitrogen, and conditioning the oxygen for delivery into a receiving system, said process comprising compressing and subjecting the air to a refrigerating effect at relatively high pressures, subjecting said air to a fractionation at relatively high pressure into two portions, one rich in oxygen and the other rich in nitrogen, subsequently rectifying said portions at a relatively low pressure to produce separate fractions, one consisting essentially of oxygen and the other consisting essentially of nitrogen, withdrawing oxygen from said one fraction in the gaseous phase and submitting it to a condensing operation by heat exchange with a colder product developed in said high pressure fractionation, withdrawing liquid oxygen from the condensing operation, sub-cooling the withdrawn liquid by heat exchange with the nitrogen product of said rectification, pumping the liquid oxygen to a relatively high pressure, using the cold of the liquid oxygen at high pressure to produce said refrigerating effect and thereby vaporizing the oxygen.

*11. In the conduct of a multistage fractionating operation in which compressed and cooled air is introduced into a high pressure fractionating zone in which air is fractionated to produce a fraction enriched in nitrogen and a fraction enriched in oxygen, liquefied fraction enriched in nitrogen being expanded and introduced into the upper portion of a lower pressure fractionating zone as reflux and fraction enriched in oxygen being introduced into the intermediate portion of the lower pressure fractionating zone, to produce gaseous nitrogen product and liquid oxygen product, the method comprising withdrawing a stream of oxygen product from the lower pressure fractionating zone, pumping the withdrawn oxygen product stream in liquid form in a manner producing rapid periodic fluctuations in pressure, cooling said stream to a temperature at which the evolution of vapor from said oxygen product at the minimum momentary pressure reached in said pumping step is substantially avoided, effecting said cooling at least in part by heat interchange between said stream and a stream of expanded liquid fraction enriched in oxygen drawn from the higher pressure fractionating zone and passing the stream of expanded fraction enriched in oxygen from the heat interchange to the lower pressure fractionating zone.*

*12. In the conduct of a multistage fractionating operation in which compressed and cooled air is introduced into a high pressure fraction-*

*ating zone in which the air is fractionated to produce a fraction enriched in nitrogen and a fraction enriched in oxygen, liquefied fraction enriched in nitrogen being expanded and introduced into the upper portion of a lower pressure fractionating zone as reflux and fraction enriched in oxygen being introduced into the intermediate portion of the lower pressure fractionating zone, to produce gaseous nitrogen product and liquid oxygen product, the method comprising withdrawing a stream of oxygen product from the lower pressure fractionating zone, pumping the withdrawn oxygen product stream in liquid phase in a manner producing rapid periodic fluctuations in pressure, cooling said stream to a temperature at which the evolution of vapor from said oxygen product at the minimum momentary pressure reached in the pumping step is substantially avoided, effecting the cooling step by heat interchange between the withdrawn oxygen product stream and a stream of gaseous nitrogen product drawn from the lower pressure zone and by heat interchange between the withdrawn oxygen product stream and a stream of expanded liquid fraction enriched in oxygen drawn from the high pressure fractionating zone, and passing the stream of expanded fraction enriched in oxygen from the heat interchange to the lower pressure fractionating zone.*

CARL R. ANDERSON.

References Cited in the file of this patent or the original patent

UNITED STATES PATENTS

| Number | Name | Date |
|---|---|---|
| 1,976,388 | Eichelman | Oct. 9, 1934 |
| 2,287,158 | Yendall | June 23, 1942 |
| 2,292,375 | Hansen | Aug. 11, 1942 |
| 2,321,445 | Yendall | June 8, 1943 |

FOREIGN PATENTS

| Number | Country | Date |
|---|---|---|
| 712,480 | Germany | Sept. 25, 1941 |
| 729,251 | France | Apr. 25, 1932 |